H. W. GOODALL.
COVERED HOSE.
APPLICATION FILED JAN. 26, 1918.

1,276,752.

Patented Aug. 27, 1918.

WITNESS:
Rob. P. Kitchel

INVENTOR
Howard W. Goodall
BY
Augustus B. Stoughton
ATTORNEY.

UNITED STATES PATENT OFFICE.

HOWARD W. GOODALL, OF ALDAN, PENNSYLVANIA.

COVERED HOSE.

1,276,752.  Specification of Letters Patent.  Patented Aug. 27, 1918.

Application filed January 26, 1918. Serial No. 213,838.

*To all whom it may concern:*

Be it known that I, HOWARD W. GOODALL, a citizen of the United States, residing at Aldan, in the county of Delaware and State of Pennsylvania, have invented certain new and useful Improvements in Covered Hose, of which the following is a specification.

This invention relates to improvements in rubber hose provided with a reinforcing cover, and its principal object is to prevent breakage and consequent leakage through the rubber portion of the hose and to maintain the proper structural connection or relation of the cover and inner portion, and to this end the invention, generally stated, comprises the combination of an inner rubber hose, an outer reinforcing cover large enough to permit of such expansion of the inner rubber hose as is due to heat and thereafter to oppose such further expansion as is due to pressure, and a fillet interposed between the hose and cover and initially adapted to maintain the proper structural relation of the spaced parts, and thereafter to yield or squash and permit the hose to fill the cover.

The invention will be claimed at the end hereof, but will be first described in connection with the embodiments of it chosen for illustration in the accompanying drawings in which—

Figure 1:
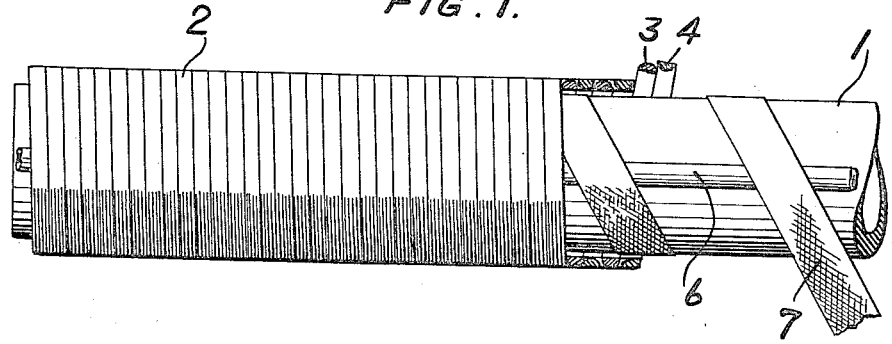
Figure 1, is an elevational view, partly in section, of a covered rubber hose embodying features of the invention.
Figure 2:
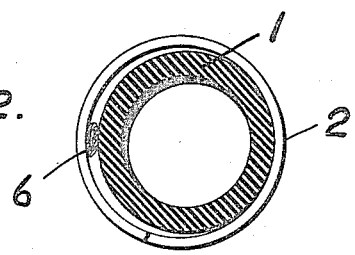
Fig. 2, is a transverse sectional view of the same.
Figure 3:
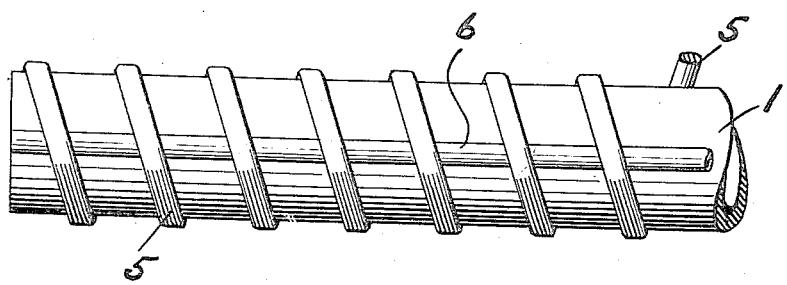
Fig. 3, is an elevational view of a covered rubber hose embodying features of the invention.

In the drawings 1, is a rubber hose, and 2, is its cover. The rubber hose 1, is, or may be, of usual construction and consist, generally, of a tube of rubber material enveloped by layers of textile or canvas and rubber. The cover 2, is, or may be, of usual construction and may consist of metal or textile fabric. As shown in Fig. 1, the cover consists of two contacting metal spirals 3 and 4, and as shown in Fig. 3, the cover consists of a metal spiral 5, having its individual turns spaced apart. However there is an important novel relation between the cover 2, and the rubber hose 1, in that they are in spaced relation so that under the action of heat the rubber hose may expand outward, thus avoiding the danger of breakage and leakage which may be present if it were compelled by a relatively tight-fitting cover to expand inward, until it comes to rest or takes a set and fills the cover which thereafter opposes further outward expansion of the hose and resists bursting pressure. Inasmuch as the hose and cover are in spaced relation they initially constitute two separate elements subject to relative displacement and unfit for transportation, handling and use, but I overcome this by placing a fillet 6, between them, and this fillet 6, initially keeps the hose and cover in proper structural relation and constitutes them in effect a unitary structure that can be conveniently shipped, handled and used. This fillet is adapted to squash or yield into a flat mass, or in effect disappear, when the rubber hose 1, expands under the action of heat and fills the cover. The fillet 6, may consist of rubber since that material can be made to possess the properties above referred to, and it is shown as a small tube of relatively soft rubber. 7, indicates adhesive tape which is an example of an expedient for holding the fillet in place during manufacture. More than one fillet may be employed and the fillet or fillets may be variously arranged, and a fillet entirely covering the hose may be used.

In use the complete covered hose constitutes in effect a unitary structure since its parts are positioned by the fillet 6, and can be shipped, handled and used without derangement of its cover, and when the covered hose is subject to heat, and pressure from within, the rubber hose expands from time to time outward under the action of heat, squashing the fillet 6, and until it fills the cover which thereafter opposes further expansion due to pressure. In this way and by allowing free outward expansion of the rubber hose under heat, breakage and leakage are avoided and the life of the hose prolonged.

Obviously modifications may be made in details of construction and arrangement of the parts without departing from the spirit of the invention, hence the latter is not limited to those matters or otherwise than as the prior art and the appended claims may require.

What I claim is:

1. A covered hose comprising in combination, a cover and a rubber hose in eccentric spaced relation, and a rubber tube interposed between the cover and hose, substantially as described.

2. A covered hose comprising in combination a cover and a rubber hose initially partly filling the cover and adapted by heat expansion to fill the same, and means between the hose and cover for spacing the cover and adapted to yield and in effect disappear to permit of such expansion, substantially as described.

HOWARD W. GOODALL.